United States Patent [19]

McGrail et al.

[11] Patent Number: 5,075,412
[45] Date of Patent: Dec. 24, 1991

[54] AROMATIC POLYMER

[75] Inventors: Patrick T. McGrail, Saltburn; Paul D. MacKenzie, Cleveland; Ian W. Parsons, Birmingham, all of England

[73] Assignee: Imperial Chemical Industries plc, London, England

[21] Appl. No.: 448,138

[22] Filed: Dec. 12, 1989

[30] Foreign Application Priority Data

Dec. 12, 1988 [GB] United Kingdom ................. 8828995

[51] Int. Cl.$^5$ ...................... C08G 8/02; C08G 14/00; C08G 65/38; C08K 5/05
[52] U.S. Cl. .................................... 528/125; 528/126; 528/128; 528/174; 528/175; 528/219; 528/220; 528/223; 528/370; 528/371; 528/373; 528/391; 525/390

[58] Field of Search ............... 528/125, 126, 128, 219, 528/174, 175, 220, 223, 370, 371, 373, 391; 525/390

[56] References Cited

U.S. PATENT DOCUMENTS 4,252,937 2/1981 Marvel et al. ................... 528/125

Primary Examiner—John Kight, III
Assistant Examiner—P. Hampton-Hightower
Attorney, Agent, or Firm—Cushman, Darby & Cushman

[57] ABSTRACT

Aromatic polymers comprise divalent aromatic units connected by ether and/or thioether linkages. At least one of such units carries at least one halogen radical linked to a nuclear carbon by a halogen-carbon bond or a functionalized derivative thereof linked to a nuclear carbon atom by a carbon-carbon bond.

8 Claims, No Drawings

AROMATIC POLYMER

This invention relates to an aromatic polymer and more particularly to a halogen-substituted polyarylether or polyarylthioether and to functionalised derivatives thereof.

According to the present invention, an aromatic polymer comprises divalent aromatic units connected by ether and/or thioether linkages, at least one of such units carrying at least one halogen radical linked to a nuclear carbon atom by a halogen-carbon bond or carrying a functionalised derivative thereof linked to a nuclear carbon atom by a carbon-carbon bond.

By "functionalised derivative" is meant a derivative formed by reacting the halogenated polymer to replace one or more halogen atoms with a functional group such as alkynyl or alkenyl, typically up to $C_5$.

The aromatic units of the polymer preferably include multiple units in which divalent aromatic radicals are linked together through a direct link or through single atom groups other than oxygen or sulphur or through alkylene. By "single atom group" is meant a divalent atom or an atom of valency greater than 2 carrying substituent(s) satisfying valency in excess of 2. Such single atom groups include for example electron-withdrawing groups such as CO, $SO_2$ and SO, and electron-donating groups such as methylene possibly substituted by hydrocarbons e.g. $C_1$-$C_6$ alkyl, 2 alkyl groups possibly being joined in a ring and/or aryl. Particular examples of suitable multiple units are based on:

biphenyl
benzophenone
diphenyl sulphone
dibenzoylbenzene
bisbenzenesulphonylbenzene
bisbenzoylbiphenyl
bisbenzenesulphonylbiphenyl
diphenylmethane
2,2'-diphenylpropane, The positions of linkages to and within such multiple units can be mutually ortho, meta or para or a combination of more than one such position.

The aromatic units of the polymer can include polynuclear aromatic units such as the analogous units in the naphthalene series.

Preferred polymers contain both electron-withdrawing and electron-donating groups.

The said at least one unit of the polymer is linked to its neighbour in the polymer chain preferably through 2 electron-donating groups or one electron-donating group and one direct link. Preferably, the said at least one unit does not carry an electron-withdrawing group. A useful example of said at least one unit is dioxy phenylene, which can carry one or two halogen radicals or functionalised derivatives thereof. Since the halogen radical can be readily introduced to aromatic units so linked, polymers of a desired halogen radical or functionalised derivative content can be made by choosing a starting polymer with the appropriate relative proportion of:

(a) aromatic units carrying two electron-donating groups or one electron-donating group and one direct link; and (b) aromatic units carrying or containing at least one electron-withdrawing group.

The resulting family of polymers differing in halogen or functionalised derivative content constitutes a particular feature of the invention.

The proportion of type (a) units can in principle be up to 100% of the total aromatic units present. More usefully and conveniently it is up to 50%, such as in a polymer in which type (a) units or pairs thereof alternate with type (b) units preferably being present as two such units linked together through a common electron-withdrawing group. A preferred polymer consists essentially of paraphenylene units linked through ether oxygen and alternating with 4,4'-diphenylsulphone; then the proportion of type (a) units is 33.3%. The proportion of type (a) units can be as low as for example 0.1%, more usually down to 1%. Not all the type (a) units need carry a halogen radical or functionalised derivative thereof.

The type (a) units can be distributed uniformly or randomly

An especially convenient polymer is that represented by the units:

$$O—Ph^1—O—Ph—A—Ph \qquad I$$

alone or in combination with

$$O—Ph—A—Ph—O—Ph—B—Ph \qquad II$$

where:
Ph is paraphenylene;
A and B are $SO_2$ or CO (and can be the same or different in the polymer chain); and
$Ph^1$ comprises said at least one unit and is phenylene.

When both units are present, the percentage molar ratio of I to II is in the range 1-99, especially 10-90 and particularly 20-80.

The polymer according to the invention has a molecular weight ranging from a small oligomer having 2-5 aromatic units capable of carrying the halogen radical or functionalised derivative thereof, up to about 100000, which is about the limit of melt-processibility. The range 1000-15000 is especially useful for polymers to be used in solution or to be processed in some way resulting in reaction to increase its molecular weight. The range 8000-50000 is especially useful for processing to self-supporting structures, for example films. Polymers in which at least a proportion of A and/or B are $SO_2$ tend to be more soluble than polymers in which A and B are CO and thus preferred for solution processing and other applications in which solubility is an important factor.

In a first particular polymer according to the invention, the halogen radical is bromo. It can be made by brominating a polymer containing type (a) units and, to the extent required, type (b) units. Bromination is carried out suitably by means of bromine in the presence of a solvent such as chloroform.

The fraction of type (a) units brominated can be controlled by choice of temperature, time and bromine concentration.

The brominated polymer has uses, such as a flame retardant, in its own right based on its physical properties; it is especially useful as an intermediate for making other polymers according to the invention.

In a second particular polymer according to the invention, the halogen radical is converted into a functionalised derivative.

The invention provides a process for functionalising the halogenated polymer by alkynylation or alkenylation of said polymer.

Functionalisation can be achieved for example by catalytic substitution.

In a preferred process, the brominated polymer is alkynylated in solution in a water soluble organic liquid, especially a lower alkylamide such as DMF, by the addition of a suitable alkynylating agent such as an alkynol and a suitable catalyst. The alkynyl radical can undergo further reactions, if desired.

The alkynylated polymer is usable as a thermoset polymer either as it stands or by modification of the alkynyl radical; or as a precursor for a graft copolymer.

Polymers according to the invention can be further utilised as follows: aqueous solutions or dispersions, possibly containing pigment, for use as surface coatings; and composites, in which the polymers are formulated with fibres, especially continuous carbon or glass, and are laid up to give laminates of a required level of isotropy.

The invention is illustrated by reference to the following examples.

EXAMPLE 1 a) A copolymer (25.0 g) containing 60 mole % I and 40 mole % II (A and B=SO$_2$, Ph$^1$=paraphenylene), was added to a stirred solution of bromine (4 ml) in chloroform (20 ml) over four minutes. To the resulting mixture was added more chloroform (25 ml). The mixture was thereafter stirred at room temperature for 6 hours. The polymer solution was then precipitated in methanol, filtered and blended with methanol until a colourless filtrate resulted. The yellow precipitate was dried under reduced pressure in an oven.

b) Copolymers containing the same repeat units in the molar ratios 5:95 and 10:90 were brominated using a similar procedure.

The polymer of process a) was analysed by elemental analysis, infrared (ir) spectroscopy and by $^{13}$C 22.5 MHz and $^1$H 400 MHz nuclear magnetic resonance (nmr) spectroscopy and the polymers of process b) were analysed by $^1$H 400 MHz nmr spectroscopy. The analysis showed monobromination on substantially all of the dioxyphenylene units, but no bromination on any of the units II.

EXAMPLE 2

Example 1a) was repeated twice using 10 ml and 3 ml of bromine, respectively, and stirring the chloroform solution for 4 and 6 hours, respectively.

The polymer resulting from the first repeat was analysed using elemental analysis, ir spectroscopy and $^{13}$C 22.5 MHz and $^1$H 400 MHz nmr spectroscopy and the analysis showed dibromination of substantially all of the dioxyphenylene units, but no bromination of any of the units II.

The polymer resulting from the second repeat was analysed using $^1$H 400 MHz nmr spectroscopy and the analysis showed monobromination of approximately 45% of the dioxyphenylene units, but no bromination of any of the units II.

EXAMPLE 3

To a stirred solution of a copolymer (25.0 g), prepared as described in Example 1, in N,N-dimethylformamide (280 ml) was added 2-methyl-3-butyn-2-ol (15.65 g), triphenylphosphine (0.23 g), bis(triphenylphosphine) palladium (II) chloride (0.31 g), copper (I) iodide (0.13 g) and methylamine (50 ml). The resulting mixture was heated to 100° C. and stirred for 6 hours. The polymer solution was then poured into methanol, the brown precipitate filtered, blended again with methanol and separately with water. The polymer was finally dried under reduced pressure in an oven. $^1$H 400 MHz nmr and ir spectroscopy showed alkynylation (shown below at III) on substantially all of the monobrominated sites of the dioxyphenylene units, whilst unit II remained unreacted.

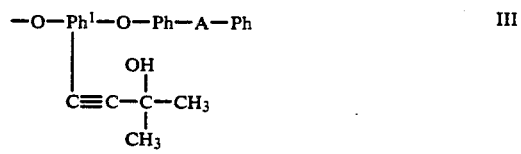

EXAMPLE 4

To a stirred solution of a copolymer (5.0 g), prepared as described in Example 3, in N,N-dimethylformamide (100 ml) at 80° C. was added hydroquinone (0.1 g), potassium hydroxide (1.0 g) and methanol (6 ml). The resulting mixture was stirred at 80° C. for 90 minutes, cooled and filtered. The polymer was blended with methanol, water and finally dried under reduced pressure in an oven. $^1$H 400 MHz nmr and ir spectroscopy showed residual mono ethynyl substituted dioxyphenylene units (shown below at IV), units II remaining unreacted.

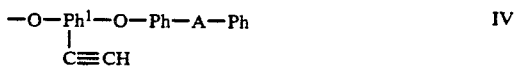

In a similar fashion a copolymer (5.0 g), prepared as described in Example 3 was dissolved in dimethylsulphoxide (100 ml) and the resulting solution was reacted with hydroquinone (0.1 g) and sodium hydroxide (1.0 g, 50% dispersion in oil) at room temperature under reduced pressure for 3 hrs. The polymer was isolated and analysed by $^1$H 400 MHz nmr and ir spectroscopy as mono ethynyl substituted dioxyphenylene units, repeat unit II remaining unreacted.

We claim:

1. An aromatic polymer comprising first divalent aromatic units alone or in combination with second divalent aromatic units wherein:
   (a) said first units carry two electron-donating groups or one electron-donating group and one direct link;
   (b) said second units carry or contain at least one electron-withdrawing group; and
   (c) said units are connected by linkages selected from the group consisting of ether, thioether and a mixture of ether and thioether linkages; and wherein at least one of said first units carries at least one halogen radical linked to a nuclear carbon atom by a halogen-carbon bond or a functionalized derivative thereof linked to a nuclear carbon by a carbon-carbon bond.

2. A process for preparing an aromatic polymer as defined in claim 1, in which at least one of said first divalent aromatic units carries said at least one halogen radical, the process comprising reacting:
   (a) a starting polymer, which starting polymer comprises first divalent aromatic units alone or in combination with second divalent aromatic units wherein:
- (i) said first units carry two electron-donating groups or one electron-donating group and one direct link;
- (ii) said second units carry or contain at least one electron-withdrawing group; and
- (iii) said units are connected by linkages selected from the group consisting of ether, thioether and a mixture of ether and thioether linkages; and (b) a halogenating agent.

3. A process for preparing an aromatic polymer as defined in claim 1, in which at least one of said first divalent aromatic units carries at least one functionalized derivative of said halogen radical, the process comprising reacting;
- (a) a starting polymer, which starting polymer comprises first divalent aromatic units alone or in combination with second divalent aromatic units wherein;
  - (i) said first units carry two electron-donating groups or one electron-donating group and one direct link;
  - (ii) said second units carry or contain at least one electron-withdrawing group; and
  - (iii) said units are connected by linkages selected from the group consisting of ether, thioether and a mixture of ether and thioether linkages; and
- (b) a halogenating agent to form a polymer comprising a halogen radical; and
- (c) by alkynylation or alkenylation convert the halogen radical into a functionalized derivative.

4. An aromatic polymer according to claim 1 comprising units of structure $$O-Ph^1-O-Ph-A-Ph \qquad I$$

alone or in combination with units of structure $$O-Ph-A-Ph-O-Ph-B-Ph \qquad II$$

where
Ph is paraphenylene;
A and B are, independently of one another, $SO_2$ or CO; and
$Ph^1$ is phenylene and carries said at least one halogen radical or a functionalised derivative thereof.

5. An aromatic polymer according to claim 4 comprising units of structures I and II in a percentage molar ratio of I to II of 10 to 90.

6. An aromatic polymer according to claim 1 wherein the halogen radical is a bromo radical.

7. An aromatic polymer according to claim 1 wherein the functionalised derivative is an alkynyl radical.

8. A process according to claim 2 wherein the starting polymer comprises units of structure $$O-Ph^1-O-Ph-A-Ph \qquad I$$

alone or in combination with units of structure $$O-Ph-A-Ph-O-Ph-B-Ph \qquad II$$

wherein
Ph is paraphenylene;
$Ph^1$ is phenylene; and
A and B are, independently of one another, $SO_2$ or CO.

* * * * *